(12) United States Patent
Wang et al.

(10) Patent No.: US 11,114,797 B2
(45) Date of Patent: Sep. 7, 2021

(54) CAGE, ELECTRICAL EQUIPMENT AND PARTITION ASSEMBLY

(71) Applicants: Tyco Electronics (Shanghai) Co. Ltd., Shanghai (CN); TE Connectivity Services GmbH, Schaffhausen (CH)

(72) Inventors: Chenxi Wang, Shanghai (CN); Hongqiang Han, Shanghai (CN); Alex Michael Sharf, Middletown, PA (US); Jingtao Zhu, Shanghai (CN); Wenyu Liu, Shanghai (CN); Steven David Dunwoody, Middletown, PA (US); Richard James Long, Middletown, PA (US)

(73) Assignees: Tyco Electronics (Shanghai) Co. Ltd., Shanghai (CN); TE Connectivity Services GmbH, Schaffhausen (CH)

( * ) Notice: Subject to any disclaimer, the term of this patent is extended or adjusted under 35 U.S.C. 154(b) by 0 days.

(21) Appl. No.: 16/737,443

(22) Filed: Jan. 8, 2020

(65) Prior Publication Data

US 2020/0220296 A1 Jul. 9, 2020

(30) Foreign Application Priority Data

Jan. 8, 2019 (CN) .......................... 201910017794.5

(51) Int. Cl.
| | |
|---|---|
| *H01R 13/00* | (2006.01) |
| *H01R 13/518* | (2006.01) |
| *H01R 13/717* | (2006.01) |
| *F21V 8/00* | (2006.01) |

(52) U.S. Cl.
CPC ......... *H01R 13/518* (2013.01); *G02B 6/0008* (2013.01); *H01R 13/7172* (2013.01); *H01R 13/7175* (2013.01)

(58) Field of Classification Search
CPC .............. H01R 13/518; H01R 13/7172; H01R 13/7175; G02B 6/0008
USPC ......................................................... 439/490
See application file for complete search history.

(56) References Cited

U.S. PATENT DOCUMENTS

| | | | | |
|---|---|---|---|---|
| 7,070,446 | B2* | 7/2006 | Henry .................. | H05K 9/0058 439/541.5 |
| 7,249,966 | B2* | 7/2007 | Long ................ | H01R 13/65802 439/490 |
| 7,357,673 | B2* | 4/2008 | Long .................... | H05K 9/0058 439/607.2 |
| 7,467,972 | B2* | 12/2008 | Long .................... | G02B 6/0001 439/541.5 |
| 7,641,515 | B1* | 1/2010 | Szczesny ........... | H01R 13/6582 439/607.01 |

(Continued)

*Primary Examiner* — Abdullah A Riyami
*Assistant Examiner* — Vladimir Imas
(74) *Attorney, Agent, or Firm* — Barley Snyder

(57) ABSTRACT

A cage includes a housing and a partition assembly mounted in the housing and separating an inner space of the housing into an upper space and a lower space. The partition assembly includes a first support plate and a second support plate arranged horizontally, and at least a pair of support frames disposed between the first support plate and the second support plate to separate the first support plate from the second support plate by a predetermined height. The support frames have a plurality of through holes. The support frames are formed by bending a front end of one of the first support plate and the second support plate.

20 Claims, 10 Drawing Sheets

(56) References Cited

U.S. PATENT DOCUMENTS

| | | | | |
|---|---|---|---|---|
| 7,704,097 B1* | 4/2010 | Phillips | H01R 13/7172 | 439/607.01 |
| 7,845,975 B2* | 12/2010 | Cheng | H01R 13/658 | 439/541.5 |
| 7,896,659 B1* | 3/2011 | Westman | H01R 13/6471 | 439/75 |
| 8,277,252 B2* | 10/2012 | Fogg | H01R 13/6587 | 439/607.25 |
| 8,469,744 B2* | 6/2013 | Nichols | H01R 13/659 | 439/607.01 |
| 8,545,267 B2* | 10/2013 | Fogg | H01R 13/6587 | 439/607.25 |
| 8,545,268 B2* | 10/2013 | Fogg | H01R 13/6587 | 439/607.25 |
| 8,834,205 B2* | 9/2014 | Fogg | H01R 4/64 | 439/607.21 |
| 8,864,523 B2* | 10/2014 | Banakis | H01R 13/6585 | 439/607.25 |
| 8,870,595 B2* | 10/2014 | Schmitt | H01R 13/717 | 439/607.25 |
| 8,890,004 B2* | 11/2014 | Wickes | H05K 9/0009 | 174/382 |
| 9,252,538 B2* | 2/2016 | Recce | H01R 13/7175 | |
| 9,728,919 B1* | 8/2017 | Dunwoody | H01R 13/6582 | |
| 9,960,553 B2* | 5/2018 | Regnier | H01R 12/7005 | |
| 2002/0025720 A1* | 2/2002 | Bright | H05K 9/0058 | 439/541.5 |
| 2002/0197043 A1* | 12/2002 | Hwang | H01R 13/659 | 385/134 |
| 2005/0254257 A1* | 11/2005 | Long | H01R 13/65802 | 362/581 |
| 2005/0254772 A1* | 11/2005 | Long | G02B 6/0008 | 385/146 |
| 2006/0003628 A1* | 1/2006 | Long | H01R 13/7172 | 439/541.5 |
| 2006/0003632 A1* | 1/2006 | Long | H01R 13/659 | 439/607.2 |
| 2010/0111476 A1* | 5/2010 | Shirk | H01R 13/7172 | 385/53 |
| 2010/0151733 A1* | 6/2010 | Tsou | H01R 13/6594 | 439/607.55 |

\* cited by examiner

CAGE, ELECTRICAL EQUIPMENT AND PARTITION ASSEMBLY

CROSS-REFERENCE TO RELATED APPLICATION

This application claims the benefit of the filing date under 35 U.S.C. § 119(a)-(d) of Chinese Patent Application No. 201910017794.5, filed on Jan. 8, 2019.

FIELD OF THE INVENTION

The present invention relates to an electrical equipment and, more particularly, to a cage for an electrical equipment.

BACKGROUND

During operation of electrical equipment such as a high-speed electrical connector, an optoelectronic conversion module or the like, it is necessary to monitor the working status of relevant components of the electrical equipment. Light emitting devices such as a plurality of light emitting diode (LED) devices are mounted at the back of the electrical equipment, and a plurality of light guide tubes are mounted on the electrical equipment. An input end of each light guide tube is mounted near one corresponding light emitting device, and an output end of the light guide tube passes through a hole in a front panel mounted on the electrical equipment and is exposed outside from the front panel. In such electrical equipment, the luminous state of each light emitting device (for example, luminescence or dimming, or a change in luminous color) may represent the working state of one or more electronic devices in the electrical equipment.

The light emitted by each light emitting device is transmitted to the front panel through the respective light guide tube, so that a worker may judge the working state of the electronic device by observing the luminous state of the output end of the light guide tube from the front panel. In stacked electrical equipment, it is generally necessary to install the light guide tubes in a partition assembly of a guide frame (also referred to as a cage) to indicate the working status of the upper and lower layers of electrical connectors.

Thereby, it is necessary to provide an additional light guide tube fixing module for fixing the light guide tubes in the partition assembly. However, the shielding performance of the partition assembly may be disadvantageously affected by the light guide tube fixing module, and the additional light guide tube fixing module will make the assembly process of the electrical equipment complex and increase the cost of the electrical equipment.

SUMMARY

A cage includes a housing and a partition assembly mounted in the housing and separating an inner space of the housing into an upper space and a lower space. The partition assembly includes a first support plate and a second support plate arranged horizontally, and at least a pair of support frames disposed between the first support plate and the second support plate to separate the first support plate from the second support plate by a predetermined height. The support frames have a plurality of through holes. The support frames are formed by bending a front end of one of the first support plate and the second support plate.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
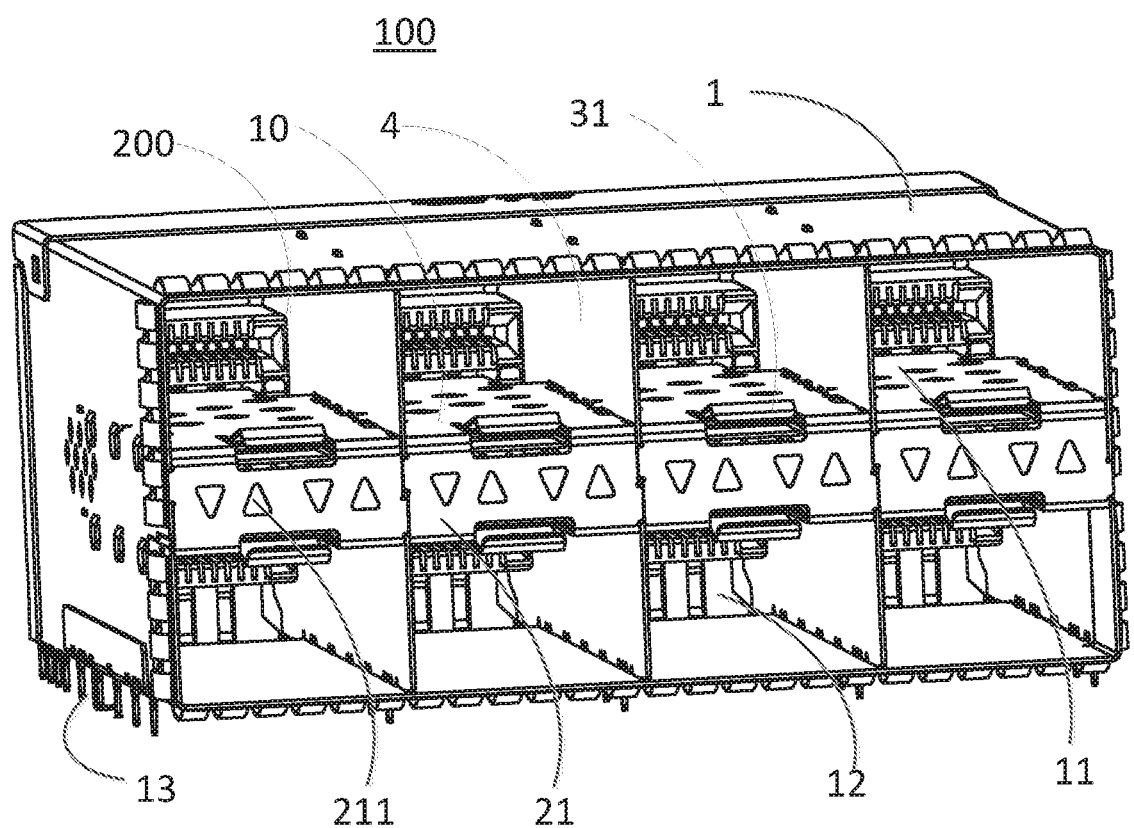
FIG. 1 is a perspective view of an electrical equipment according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An electrical equipment 100 according to an embodiment, as shown in FIG. 1, comprises a cage and an electronic module 200 mounted in the cage. In various embodiments, the electrical equipment 100 is a high-speed electrical connector, an optoelectronic conversion module, or the like. The electrical equipment 100 may be electrically connected with a mating module inserted into the cage to realize the transmission of power supply and/or electric signals, or to convert optical signals transmitted from the mating module into electric signals.

For ease of understanding, as shown in FIG. 1, a first end of the cage for mounting the electronic module 200 is referred to as a rear end, and a second end opposite to the rear end of the cage (that is, the end of the cage for inserting the mating module) is referred as a front end or an insertion end. The rear and front ends of other parts are similarly referenced.

In the embodiment shown in FIG. 1, the cage comprises a roughly cuboid housing 1 made of metallic material and a partition assembly 10. An inner space is defined in the housing 1. The partition assembly 10 is mounted in the housing 1 to separate the inner space of the housing 1 into an upper space and a lower space. Mating modules may be inserted into the upper space and the lower space in an insertion direction. The electronic module 200 is mounted at the rear end of the cage. A plurality of installation pins 13 are disposed on a lower end of the housing 1. The housing 1 may be mechanically mounted on a circuit board by the installation pins 13.

Figure 2:
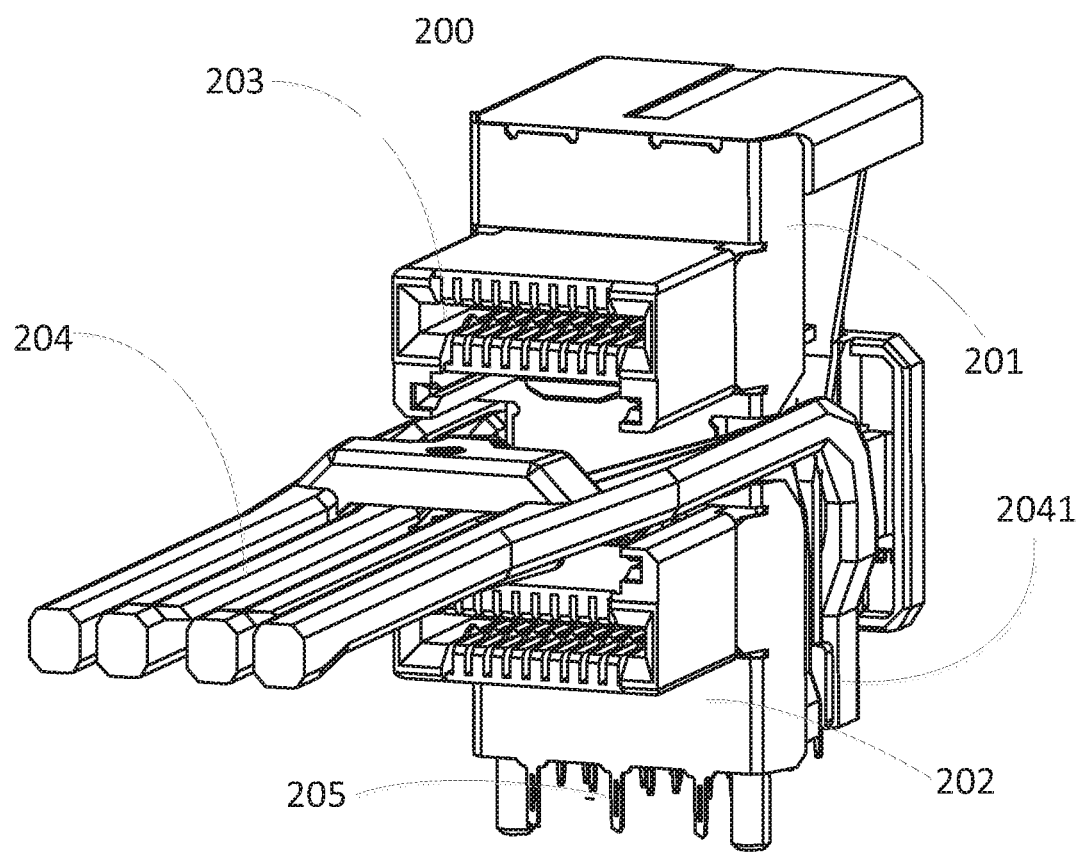
FIG. 2 is a perspective view of an electronic module of the electrical equipment of FIG. 1.

As shown in FIGS. 1 and 2, the electronic module 200 comprises an upper electronic module 201 mounted in the upper space 11 and a lower electronic module 202 mounted in the lower space 12 of the housing 1. Each of the upper electronic module 201 and the lower electronic module 202 includes an interface 203 adapted to be electrically connected with a mating interface of a mating electronic module inserted into the upper space 11 or the lower space 12. The electronic module 200 includes a plurality of electrical pins 205 adapted to be inserted into holes formed in the circuit board, so as to electrically connect the electrical equipment 100 to the circuit board.

As shown in FIG. 1, the partition assembly 10 is mounted in the housing 1 and separates the inner space of the housing 1 into the upper space 11 and the lower space 12 to receive the mating modules inserted into the upper space and the lower space in the insertion direction, respectively.

The partition assembly 10, as shown in FIGS. 4-8, includes a first support plate 2 and a second support plate 3 arranged horizontally, and at least two support frames provided between the first support plate 2 and the second support plate 3. The support frames are perpendicular to the insertion direction (a direction from right to left in FIG. 7), so as to separate the first support plate 2 from the second support plate 3 by a predetermined height. The support frames are provided with through holes 211, 231 aligned to each other in a fore-and-aft direction (that is the insertion direction) of the partition assembly 10. The support frames are formed by bending a front end of one of the first support plate 2 and the second support plate 3.

Figure 4:
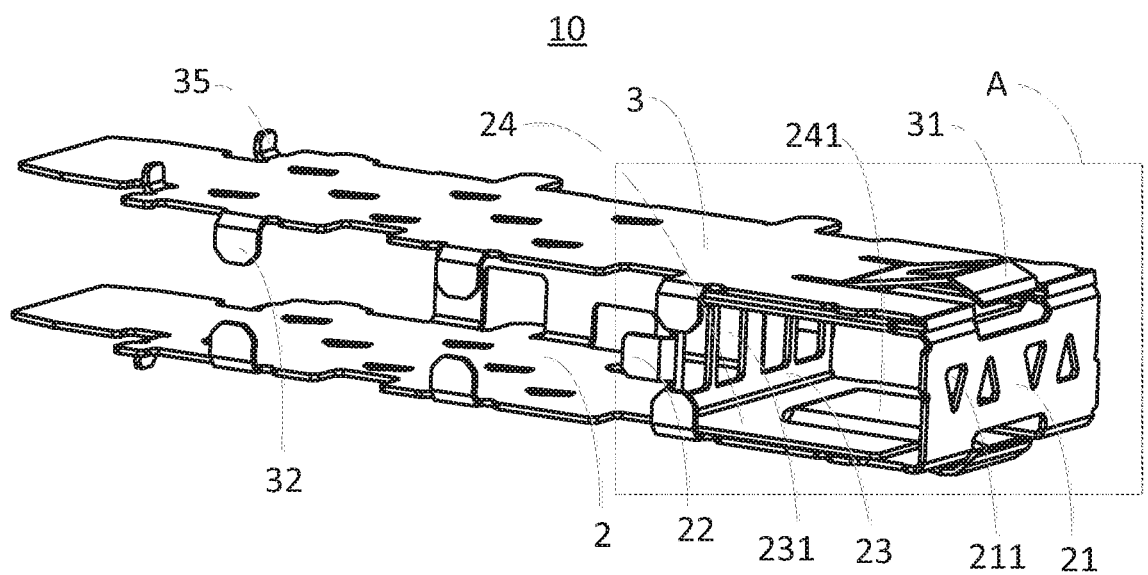
FIG. 4 is a perspective view of a partition assembly according to an embodiment.
Figure 5:
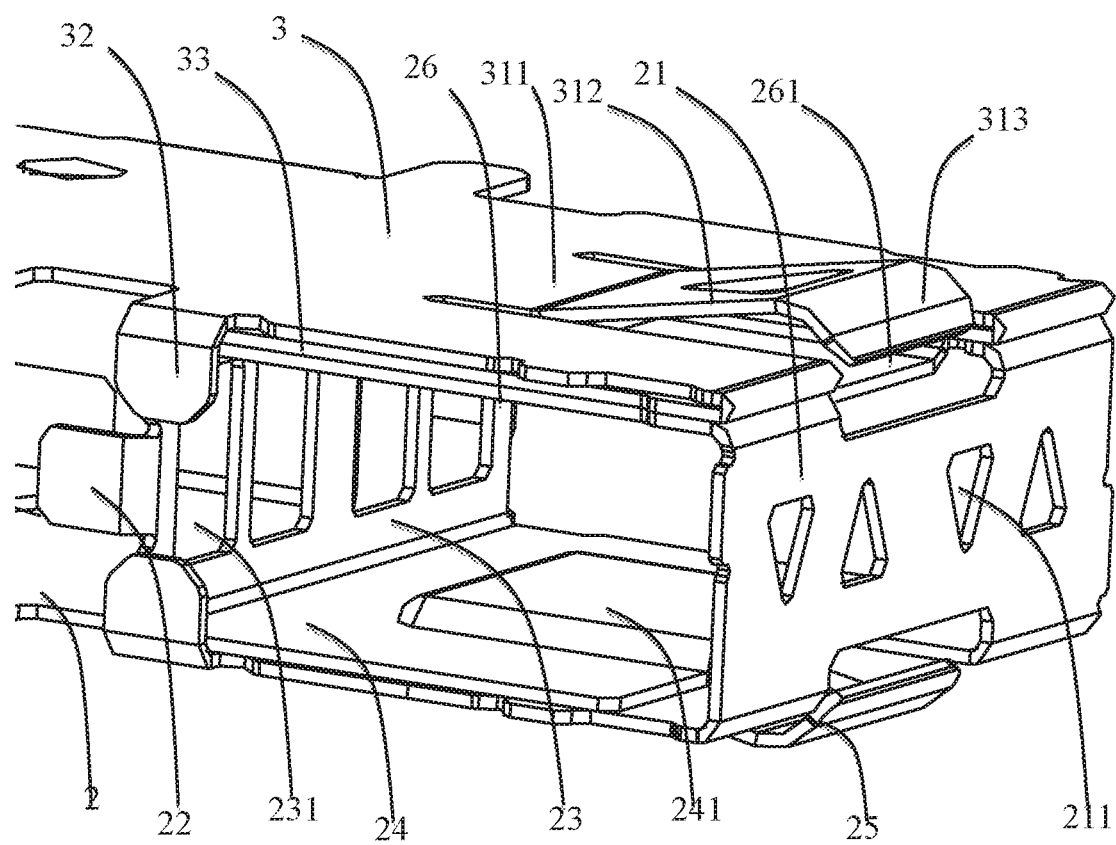
FIG. 5 is a perspective view of a portion A of FIG. 4.
Figure 7:
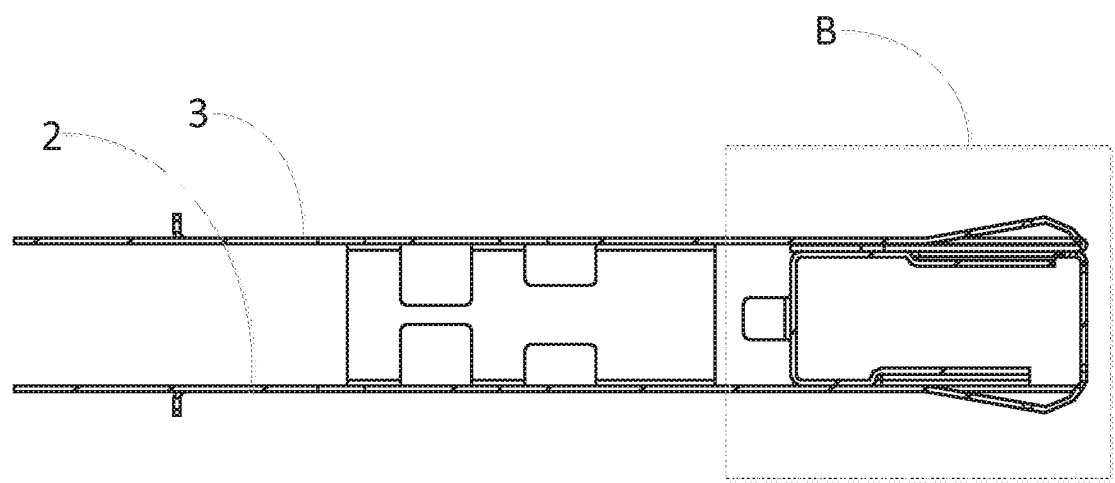
FIG. 7 is a side view of the partition assembly of FIG. 4.

In the embodiment shown in FIGS. 4, 5, and 7, the front end of the first support plate 2 which is located a lower portion of the partition assembly 10 is bent upward by 90 degrees to form a front support frame 21 of the support frames. An upper end of the front support frame 21 is bent backward by 90 degrees to form an upper support frame 26. A rear end of the upper support frame 26 is bent downward by 90 degrees to form a rear support frame 23. The through holes 211 and 231 formed in the front support frame 21 and the rear support frame 23, respectively, are aligned to each other. In addition, a lower end of the rear support frame 23 is bent forward by 90 degrees to form a lower support frame 24. In this way, the support frames have a rectangular cross section and are overlaid on the first support plate 2. The bent support frames increase the support strength of the first support plate 2 and the second support plate 3, simplify the manufacturing process of the support frames, and reduce the manufacturing cost thereof. Through holes 211 and 231 may be used as a heat dissipation channel between the first support plate 2 and the second support plate 3 to improve the heat dissipation effect of the cage.

Figure 6:
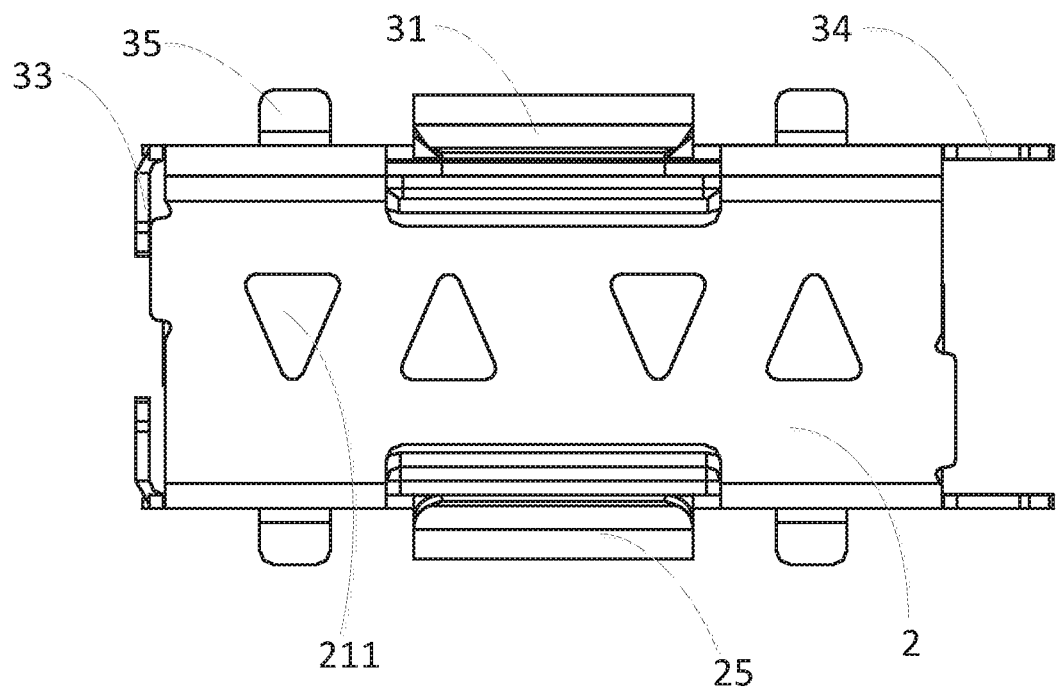
FIG. 6 is a front view of the partition assembly of FIG. 4.
Figure 8:
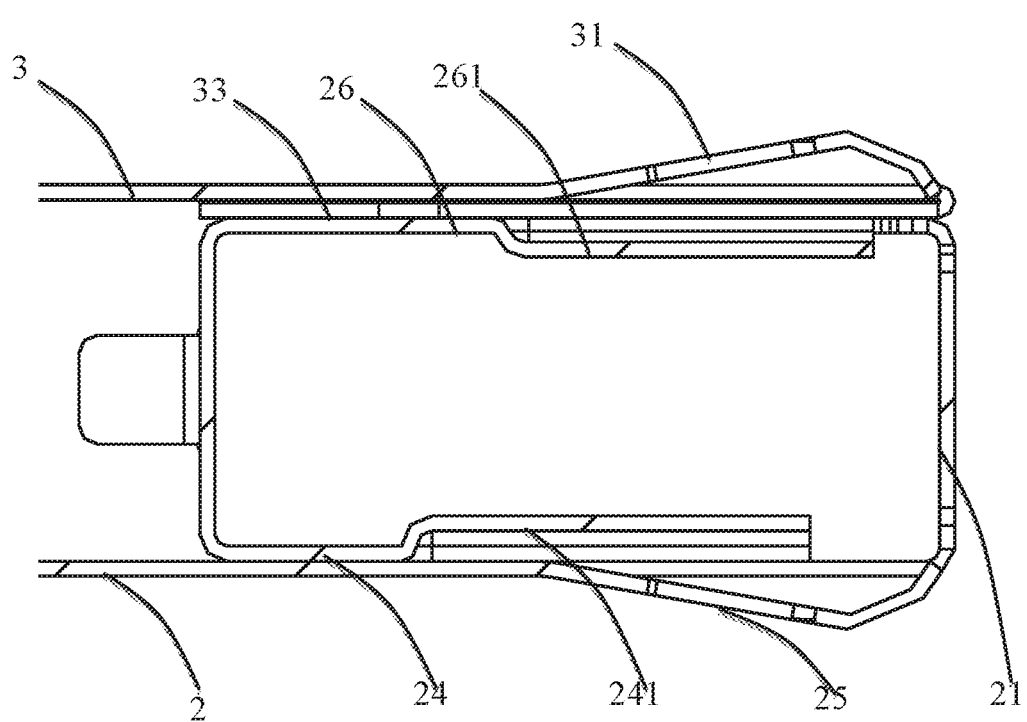
FIG. 8 is a side view of a portion B of FIG. 7.

As shown in FIGS. 5, 6, and 8, the front end of the second support plate 3 is bent backward to form an auxiliary support frame 33 overlaid on the upper support frame 26. The first support plate 2 and the second support plate 3 may be combined by soldering the upper support frame 26 and the auxiliary support frame 33 together.

As shown in FIGS. 4-8, at least one of the first support plate 2 and the second support plate 3 has an elastic sheet 25, 31 obliquely extending into the lower space 12 and/or the upper space 11. During inserting the mating modules into the lower space 12 or the upper space 11, the elastic sheet 25, 31 are pressed and deformed to reliably hold the mating modules in the cage.

The elastic sheets 25, 31, as shown in FIGS. 5-8, include an upper elastic sheet 31 and a lower elastic sheet 25. The upper elastic sheet 31 has a first horizontal part 311 and a first oblique part 312. The first horizontal part 311 extends substantially horizontally from the second support plate 3 towards the front end of the second support plate 3. The first oblique part 312 obliquely extends from a front end of the first horizontal part 311 towards the front end of the second support plate 3. The lower elastic sheet 25 has the same structure as the upper elastic sheet 31. The lower elastic sheet 25 has a second horizontal part and a second oblique part. The second horizontal part extends substantially horizontally from the first support plate 2 towards the front end of the first support plate 2. The second oblique part obliquely extends from a front end of the second horizontal part towards the front end of the first support plate 2. The elastic force of the elastic sheet 25, 31 may be increased by providing the horizontal part and the oblique part.

As shown in FIGS. 5 and 8, an upper recess 261 is provided in the auxiliary support frame 33 and/or the upper support frame 26 to accommodate a partial deformed part of the upper elastic sheet 31 when the upper elastic sheet 31 is pressed. In an embodiment, a notch is formed in the auxiliary support frame 33, and the upper recess is formed in the upper support frame 26. The upper elastic sheet 31, the notch, and the upper recess 261 are substantially aligned to each other in a vertical direction perpendicular to the insertion direction. Thereby, when the upper elastic sheet 31 is pressed by the mating module, the first oblique part 312 may guide the first horizontal part 311 into the notch and the upper recess 261. In this way, the upper elastic sheet 31 does not exceed the upper surface of the second support plate 3 in the pressed state, so that the mating module may make full use of the upper space 11 and increase the elasticity of the upper elastic sheet 31.

Similarly, as shown in FIGS. 4, 5, and 8, a lower recess 241 is provided in the lower support frame 24 of the first support plate 2 to accommodate a partial deformed part of the lower elastic sheet 25 when the lower elastic sheet 25 is pressed. Thereby, when the lower elastic sheet 25 is pressed by the mating module, the second oblique part may guide the second horizontal part into the lower recess 241. In this way, the lower elastic sheet 25 does not exceed the lower surface of the first support plate 2 in the pressed state, so that the mating module may make full use of the lower space 12 and increase the elasticity of the lower elastic sheet 25.

In an exemplary embodiment, the upper elastic sheet 31 and the lower elastic sheet 25 may be formed by punching the second support plate 3 and the first support plate 2, respectively.

As shown in FIGS. 4 and 5, a shielding wing 22 is provided on the rear support frame 23 and vertically extends with respect to the rear support frame 23, so as to increase the anti-electromagnetic interference performance of the cage.

As shown in FIGS. 4 and 6, the first support plate 2 and the second support plate 3 each have a blocking sheet 35 vertically extending towards the lower space 12 and the upper space 11 to prevent the electronic module 200 disposed at the back of the blocking sheet 35 from being moved towards a front end of the cage.

As shown in FIGS. 1, 4, and 5, a plurality of installation wings 32 are formed on each side of the first support plate 2 and the second support plate 3. The partition assembly 10 may be mounted on the side wall or a partition wall 4 of the housing 1 by the installation wings 32. The partition wall 4 is provided between a top wall and a bottom wall of the housing 1 to separate the inner space of the housing 1 into a plurality of left and right separate spaces. In this way, the inner space of the housing 1 may be separated into subspaces of two rows and multiple columns by the partition assembly 10 and the partition wall 4. Thereby a plurality of electronic modules may be accommodated in the subspaces, respectively.

Figure 3:
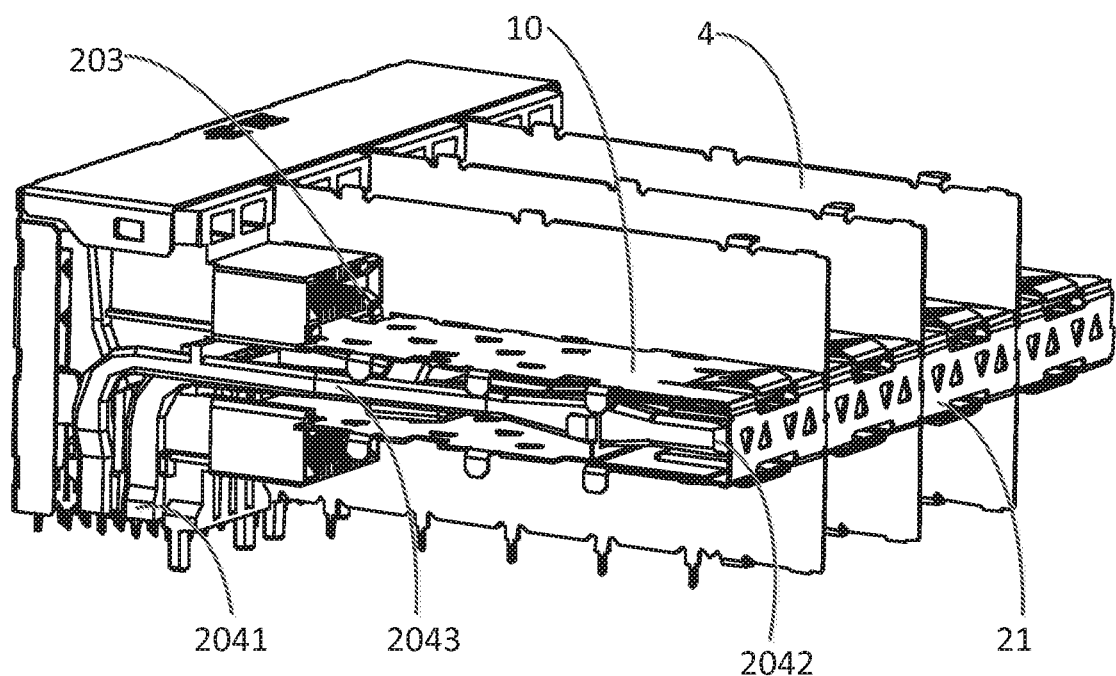
FIG. 3 is a perspective view of the electrical equipment of FIG. 1 with a housing removed.

As shown in FIGS. 2 and 3, in order to monitor the working status of the associated components of the electrical equipment 100, at least one light emitting device such as a light emitting diode (LED) or the like is mounted in the rear of the cage of the electrical equipment 100. The electronic module 200 has at least one light guide tube 204, and each light guide tube 204 has a main body 2043, a receiving end 2041, and an indication end 2042. The main body 2043 is mounted in a space of the partition assembly 10 defined by the first support plate 2 and the second support plate 3. The receiving end 2041 vertically extends from a rear end of the main body 2043 and faces a corresponding light emitting device, so as to receive a light, which indicates a working state of the electronic module, emitted by the light emitting device. The indication end 2042 is mounted on the support frame and aligned to the corresponding through hole 231, 211 in the insertion direction, so as to indicate the working state of the electronic module 200.

In the electrical equipment 100, the luminous state of each light emitting device (for example, luminescence or dimming, or a change in luminous color) may represent the working state of one or more electronic devices in the electrical equipment 100. The light emitted by each light emitting device is transmitted to the front portion of the cage through the light guide tube 204, so that a worker may determine the working state of the electronic device by observing the luminous state of the output end 2042 of the light guide tube 204 from the front portion of the cage.

The through hole 231 formed in the rear support frame 23 has a shape adapted to fix the main body 2043 of the light guide tube 204. By providing the rear support frame 23, the main body 2043 of the light guide tube 204 may be supported in the through hole 231, and it is not necessary to provide any other support components for supporting the light guide tube 204, thus simplifying the structure of the light guide tube 204.

An electrical equipment 100' according to another embodiment, as shown in FIGS. 9-14, comprises a cage and an electronic module 200' mounted in the cage. The cage has a roughly cuboid housing 1' made of metallic material and a partition assembly 10'. An inner space is defined in the housing 1'. The partition assembly 10' is mounted in the housing 1' to separate the inner space of the housing 1' into an upper space and a lower space. The mating modules (not shown) may be inserted into the upper space and the lower space in an insertion direction. In addition, a plurality of partition walls 4' are provided in the housing 1'. In this way, the inner space of the housing 1' may be separated into subspaces of two rows and multiple columns by the partition assembly 10 and the partition walls 4. Thereby, a plurality of electronic modules may be accommodated in the subspaces.

Figure 9:
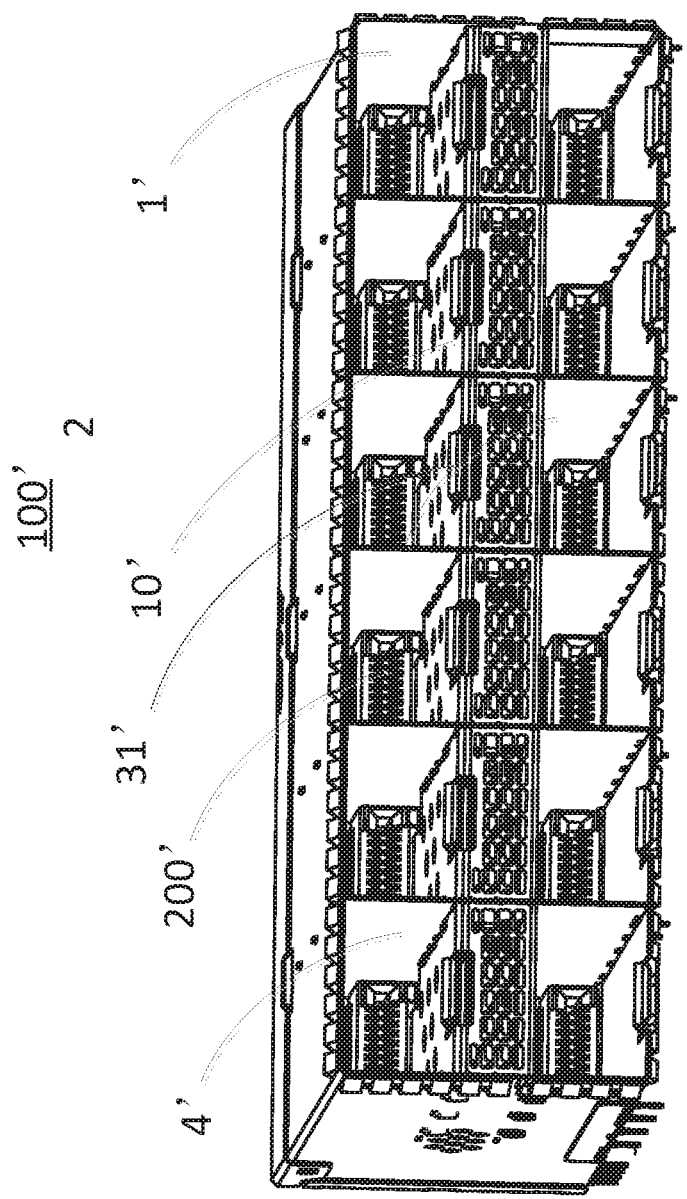
FIG. 9 is a perspective view of an electrical equipment according to another embodiment.
Figure 10:
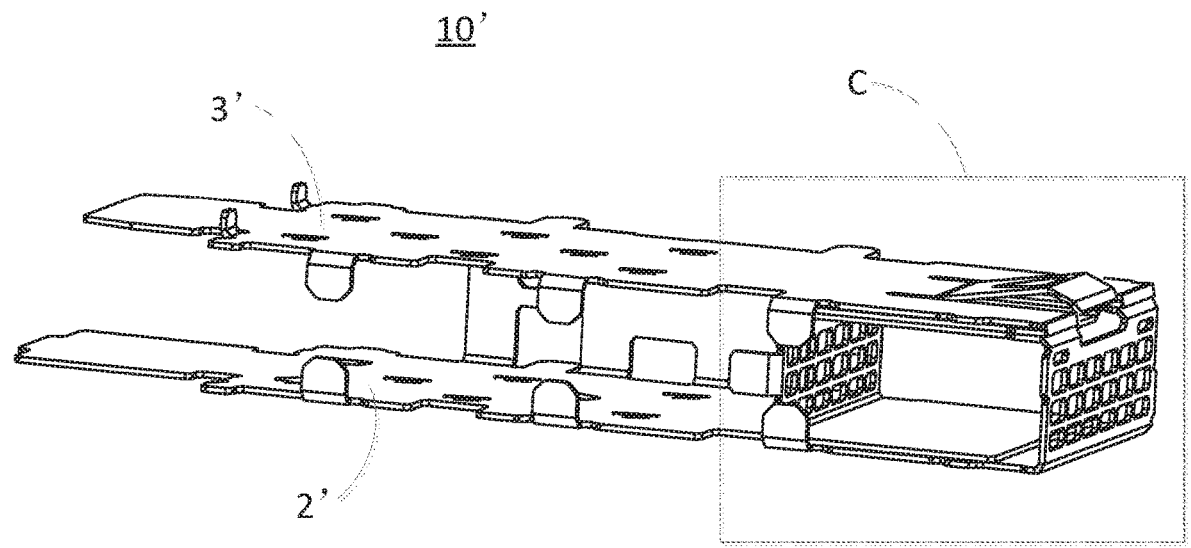
FIG. 10 is a perspective view of a partition assembly according to another embodiment.

As shown in FIG. 9, the partition assembly 10' made of metal is mounted in the housing 1' and separates the inner space of the housing 1' into the upper space and the lower space to receive the mating modules inserted into the upper space and the lower space in the insertion direction. The partition assembly 10', as shown in FIGS. 10-13, includes a first support plate 2' and a second support plate 3' arranged horizontally, and at least two support frames provided between the first support plate 2' and the second support plate 3'.

The support frames are perpendicular to the insertion direction (a direction from right to left in FIG. 13), so as to separate the first support plate 2' from the second support plate 3' by a predetermined height. Two support frames are provided with through holes 211', 231' aligned to each other in the insertion direction. The two support frames are formed by bending a front end of one of the first support plate 2' and the second support plate 3'. The through holes 211' and 231' may be used as a heat dissipation channel between the first support plate 2' and the second support plate 3' to improve the heat dissipation effect of the cage.

As shown in FIGS. 10-14, the front end of the first support plate 2' is bent upward by 90 degrees to form a front support frame 21' of the support frame. An upper end of the front support frame 21' is bent backward by 90 degrees to form an upper support frame 26'. A rear end of the upper support frame 26' is bent downward by 90 degrees to form a rear support frame 23'. Through holes 211' and 231' formed in the front support frame 21' and the rear support frame 23', respectively, are aligned to each other. In addition, a lower end of the rear support frame 23' is bent forward by 90 degrees to form a lower support frame 24'. The support frame has a substantially rectangular cross section and is overlaid on the upper portion of the first support plate 2'. The bent support frame may increase the support strength of the first support plate 2' and the second support plate 3', simplify the manufacturing process of the support frame, and reduce the manufacturing cost.

Figure 11:
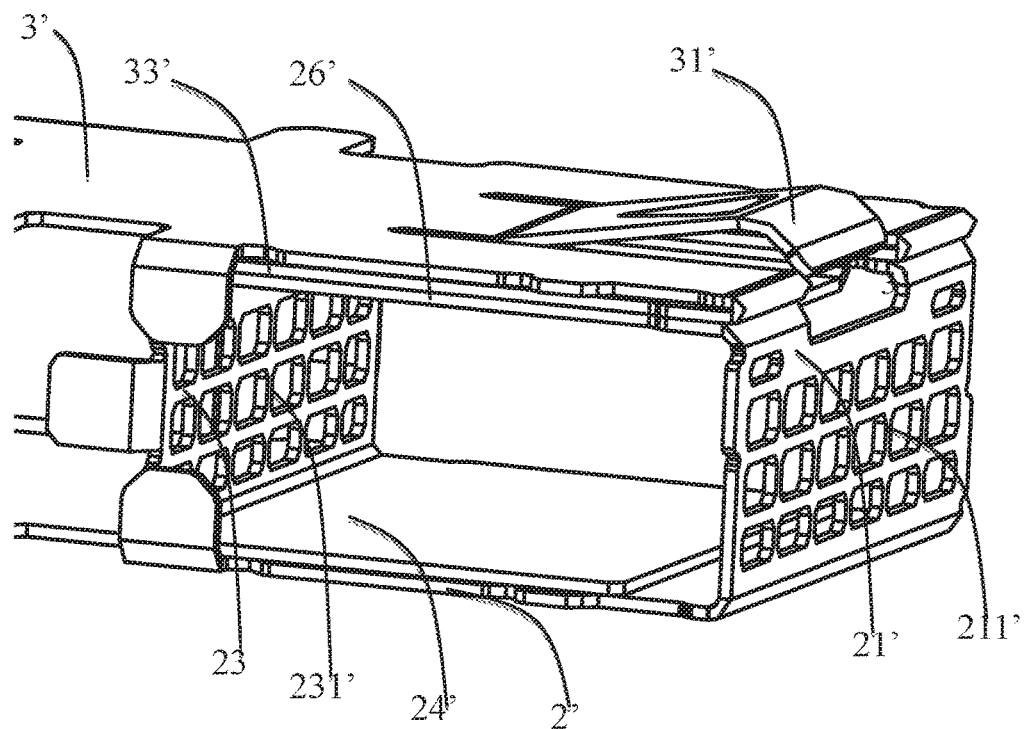
FIG. 11 is a perspective view of a portion C of FIG. 10.
Figure 12:
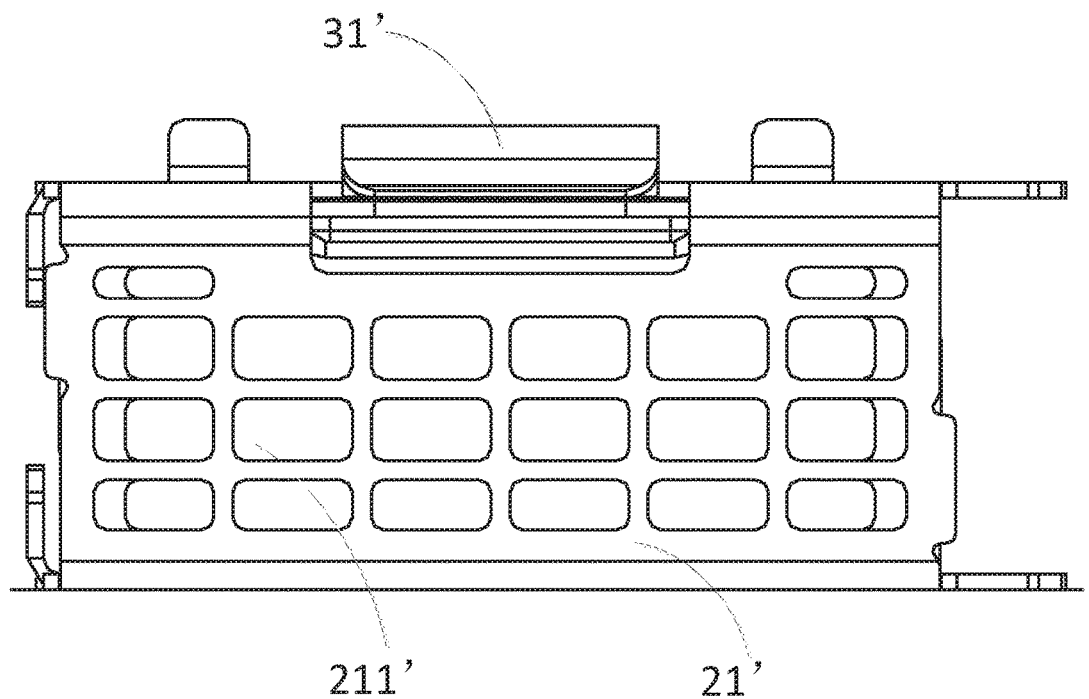
FIG. 12 is a front view of the partition assembly of FIG. 10.
Figure 13:
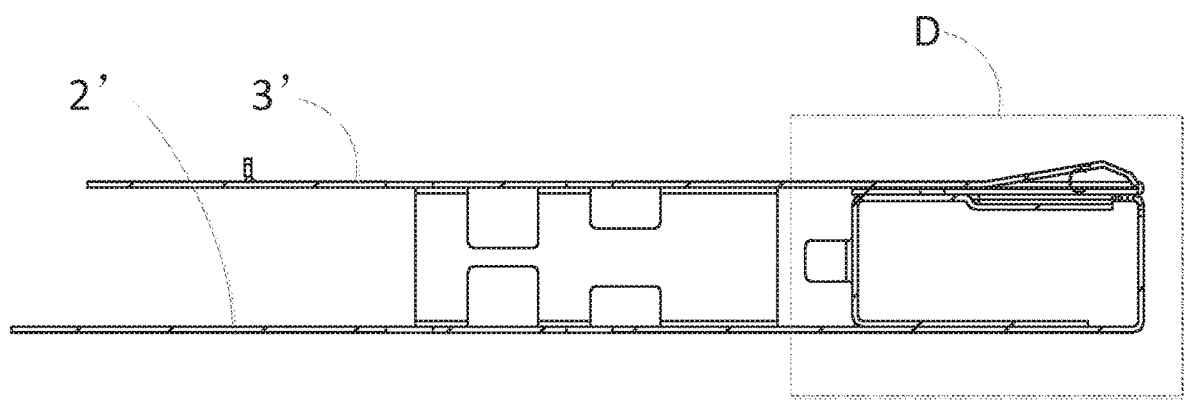
FIG. 13 is a side view of the partition assembly of FIG. 10.

As shown in FIGS. 11-13, the front end of the second support plate 3' is bent backward to form an auxiliary support frame 33' overlaid on the upper support frame 26'. The first support plate 2' and the second support plate 3' may be combined by soldering the upper support frame 26' and the auxiliary support frame 33' together.

As shown in FIGS. 10-14, the second support plate 3' has an elastic sheet 31' obliquely extending into the upper space. During inserting the mating module into the upper space 11, the elastic sheet 31' is pressed and deformed to reliably hold the mating module in the cage.

The elastic sheet 31', as similarly shown in the embodiment of FIG. 5, has a first horizontal part 311' and a first oblique part 312'. The first horizontal part 311' extends substantially horizontally from the second support plate 3' towards the front end of the second support plate 3'. The first oblique part 312' obliquely extends from a front end of the first horizontal part 311' towards the front end of the second support plate 3'. In this case, the elastic force of the elastic sheet 31' may be increased by providing the first horizontal part and the oblique part.

Figure 14:
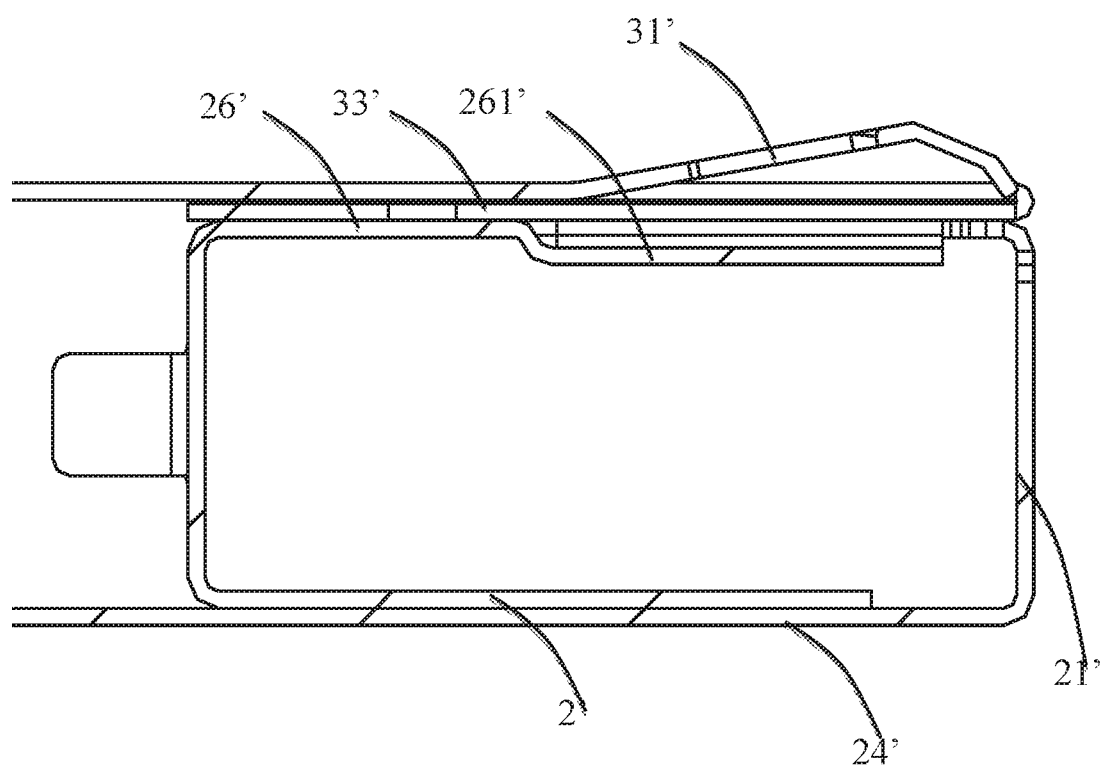
FIG. 14 is a side view of a portion D of FIG. 13.

As shown in FIG. 14, an upper recess 261' is provided on the auxiliary support frame 33' and/or the upper support frame 26' to accommodate a partial deformed part of the elastic sheet 31' when the elastic sheet 31' is pressed. In an embodiment, a notch is formed in the auxiliary support frame 33', and the upper recess 261' is formed in the upper support frame 26'. The elastic sheet 31', the notch and the upper recess 261' are substantially aligned to each other in a vertical direction perpendicular to the insertion direction. Thereby, when the elastic sheet 31' is pressed by the mating module, the first oblique part 312' may guide the first horizontal part 311' into the notch and the upper recess 261'. In this way, the elastic sheet 31' does not exceed the upper surface of the second support plate 3' in the pressed state, so that the mating module may make full use of the upper space and increase the elasticity of the elastic sheet 31'.

In an exemplary embodiment, the elastic sheet 31' may be formed by punching the second support plate 3'.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A cage, comprising:
   a housing; and
   a partition assembly mounted in the housing and separating an inner space of the housing into an upper space and a lower space, the partition assembly including a first support plate and a second support plate arranged horizontally, and at least a pair of support frames disposed between the first support plate and the second support plate to separate the first support plate from the second support plate by a predetermined height, the support frames have a plurality of through holes, the support frames are formed by bending a front end of one of the first support plate and the second support plate, the front end of the first support plate is bent upward by 90 degrees to form a front support frame of the support frame, an upper end of the front support frame is bent backward by 90 degrees to form an upper support frame, and a rear end of the upper support frame is bent downward by 90 degrees to form a rear support frame.

2. The cage of claim 1, wherein a lower end of the rear support frame is bent forward by 90 degrees to form a lower support frame, and/or the front end of the second support plate is bent backward to form an auxiliary support frame overlaid on the upper support frame.

3. The cage of claim 2, wherein at least one of the first support plate and the second support plate has an elastic sheet obliquely extending into the lower space and/or the upper space.

4. The cage of claim 3, wherein the elastic sheet includes an upper elastic sheet having a first horizontal part extending substantially horizontally from the second support plate towards the front end of the second support plate, and a first oblique part obliquely extending from a front end of the first horizontal part towards the front end of the second support plate.

5. The cage of claim 4, wherein the elastic sheet includes a lower elastic sheet having a second horizontal part extending substantially horizontally from the first support plate towards the front end of the first support plate, and a second oblique part obliquely extending from a front end of the second horizontal part towards the front end of the first support plate.

6. The cage of claim 4, wherein the auxiliary support frame and/or the upper support frame has an upper recess receiving a partial deformed part of the upper elastic sheet when the upper elastic sheet is pressed, and the lower support frame has a lower recess receiving a partial deformed part of the lower elastic sheet when the lower elastic sheet is pressed.

7. The cage of claim 6, wherein the auxiliary support frame has a notch and the upper recess is formed in the upper support frame, the upper elastic sheet, the notch, and the upper recess are substantially aligned with each other in a vertical direction perpendicular to an insertion direction.

8. The cage of claim 1, wherein the first support plate and the second support plate each have a blocking sheet vertically extending towards the lower space and the upper space to prevent an electronic module disposed at a back of the blocking sheet from being moved towards a front end of the cage.

9. The cage of claim 1, wherein the through holes in the support frames are aligned with each other in a fore-and-aft direction of the partition assembly.

10. An electrical equipment, comprising:
    a cage including a housing and a partition assembly mounted in the housing and separating an inner space of the housing into an upper space and a lower space, the partition assembly including a first support plate and a second support plate arranged horizontally, and at least a pair of support frames spaced apart from one another in a fore-and-aft direction of the partition assembly and disposed between the first support plate and the second support plate to separate the first support plate from the second support plate by a predetermined height, the support frames have a plurality of through holes, the support frames are formed by bending a front end of one of the first support plate and the second support plate; and
    an electronic module including an upper electronic module mounted in the upper space of the housing and a lower electronic module mounted in the lower space of the housing, each of the upper electronic module and the lower electronic module includes an interface adapted to be electrically connected with a mating interface of a mating electronic module inserted into the upper space or the lower space.

11. The electrical equipment of claim 10, wherein the electronic module includes a light guide tube having a main body mounted in the partition assembly, a receiving end vertically extending from a rear end of the main body and receiving a light emitted by a light emitting device indicating a working state of the electronic module, and an indication end mounted on the support frame and aligned with one of the through holes.

12. A partition assembly separating an inner space of a housing into an upper space and a lower space, comprising:
    a first support plate and a second support plate arranged horizontally; and
    at least a pair of support frames disposed between the first support plate and the second support plate to separate the first support plate from the second support plate by a predetermined height, the support frames have a plurality of through holes, the support frames are formed by bending a front end of one of the first support plate and the second support plate, the front end of the first support plate is bent upward by 90 degrees to form a front support frame of the support frame, an upper end of the front support frame is bent backward by 90 degrees to form an upper support frame, and a rear end of the upper support frame is bent downward by 90 degrees to form a rear support frame.

13. The partition assembly of claim 12, wherein a lower end of the rear support frame is bent forward by 90 degrees to form a lower support frame, and/or the front end of the second support plate is bent backward to form an auxiliary support frame overlaid on the upper support frame.

14. The partition assembly of claim 13, wherein at least one of the first support plate and the second support plate has an elastic sheet obliquely extending into the lower space and/or the upper space.

15. The partition assembly of claim 14, wherein the elastic sheet includes an upper elastic sheet having a first horizontal part extending substantially horizontally from the second support plate towards the front end of the second support plate, and a first oblique part obliquely extending from a front end of the first horizontal part towards the front end of the second support plate.

16. The partition assembly of claim 15, wherein the elastic sheet includes a lower elastic sheet having a second horizontal part extending substantially horizontally from the first support plate towards the front end of the first support plate, and a second oblique part obliquely extending from a front end of the second horizontal part towards the front end of the first support plate.

17. The partition assembly of claim 16, wherein the auxiliary support frame and/or the upper support frame has an upper recess receiving a partial deformed part of the upper elastic sheet when the upper elastic sheet is pressed, and the lower support frame has a lower recess receiving a partial deformed part of the lower elastic sheet when the lower elastic sheet is pressed.

18. The partition assembly of claim 17, wherein the auxiliary support frame has a notch and the upper recess is formed in the upper support frame, the upper elastic sheet, the notch, and the upper recess are substantially aligned with each other in a vertical direction perpendicular to an insertion direction.

19. A cage, comprising:
a housing; and
a partition assembly mounted in the housing and separating an inner space of the housing into an upper space and a lower space, the partition assembly including a first support plate and a second support plate arranged horizontally, and at least a pair of support frames disposed between the first support plate and the second support plate to separate the first support plate from the second support plate by a predetermined height, the support frames have a plurality of through holes, the support frames are formed by bending a front end of one of the first support plate and the second support plate, the first support plate and the second support plate each have a blocking sheet vertically extending towards the lower space and the upper space to prevent an electronic module disposed at a back of the blocking sheet from being moved towards a front end of the cage.

20. A partition assembly separating an inner space of a housing into an upper space and a lower space, comprising:
a first support plate and a second support plate arranged horizontally; and
at least a pair of support frames spaced apart from one another in a fore-and-aft direction of the partition assembly and disposed between the first support plate and the second support plate to separate the first support plate from the second support plate by a predetermined height, the support frames have a plurality of through holes, the support frames are formed by bending a front end of one of the first support plate and the second support plate.

* * * * *